United States Patent
Meng et al.

(10) Patent No.: US 9,831,761 B2
(45) Date of Patent: Nov. 28, 2017

(54) SPEEDY DISCHARGING CIRCUIT AND POWER SUPPLY APPARATUS WITH SPEEDY DISCHARGING CIRCUIT

(71) Applicant: Chicony Power Technology Co., Ltd., New Taipei (TW)

(72) Inventors: Hsiang-Chueh Meng, New Taipei (TW); Yu-Chieh Huang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 138 days.

(21) Appl. No.: 14/662,680

(22) Filed: Mar. 19, 2015

(65) Prior Publication Data

US 2016/0276853 A1    Sep. 22, 2016

(51) Int. Cl.
*H02J 7/00* (2006.01)
*H02M 1/32* (2007.01)

(52) U.S. Cl.
CPC ........ *H02M 1/32* (2013.01); *H02M 2001/322* (2013.01)

(58) Field of Classification Search
CPC ................................ H02J 7/0031; H02J 7/345
USPC .................................. 320/127, 135, 163, 166
See application file for complete search history.

(56) References Cited

U.S. PATENT DOCUMENTS

| | | | | |
|---|---|---|---|---|
| 5,956,240 A | * | 9/1999 | Williams | H02M 3/33523 348/E5.127 |
| 2014/0062421 A1 | * | 3/2014 | Jeong | H02J 3/00 320/166 |

* cited by examiner

*Primary Examiner* — Edward Tso
*Assistant Examiner* — Aaron Piggush
(74) *Attorney, Agent, or Firm* — Muncy, Geissler, Olds & Lowe, P.C.

(57) ABSTRACT

A speedy discharging circuit is applied to a power supply. The speedy discharging circuit is electrically connected to the power supply. The power supply includes a power output side and an output side capacitor. The output side capacitor is electrically connected to the power output side. The speedy discharging circuit includes an energy consuming unit, a switch unit and a switch control unit. The energy consuming unit is electrically connected to the power output side and the output side capacitor. The switch unit is electrically connected to the energy consuming unit. The switch control unit is electrically connected to the switch unit. When the switch control unit receives a sleep signal, the switch control unit turns on the switch unit, so that the output side capacitor discharges to the energy consuming unit.

8 Claims, 2 Drawing Sheets

SPEEDY DISCHARGING CIRCUIT AND POWER SUPPLY APPARATUS WITH SPEEDY DISCHARGING CIRCUIT

BACKGROUND OF THE INVENTION

Field of the Invention

The present invention relates to a discharging circuit and power supply apparatus, and especially relates to a speedy discharging circuit and a power supply apparatus with the speedy discharging circuit.

Description of the Related Art

The power supply is a very common electronic apparatus. The power supply supplies power to the electronic apparatus to drive the electronic apparatus. Therefore, the power supply is very important. Usually, the power supply receives the alternating current power and converts the alternating current power into the output direct current power.

Nowadays, a conventional power supply comprises two different output voltages: the high voltage (for examples, 32 volts, 30 volts or 24 volts etc.) and the low voltage (for examples, 15 volts, 12 volts or 5 volts etc.). The output voltage of the power supply is the high voltage when the power supply works in the normal mode (for example, supplying power to the electronic apparatus). The output voltage of the power supply is changed to be the low voltage for energy saving when the power supply is in the sleeping mode or the standby mode. The switching time of being changed from the high voltage to the low voltage will be prolonged because there is an output side capacitor arranged in the output side of the power supply. This will cause that the time for entering the sleeping mode or the standby mode detected by the system will be prolonged. Therefore, at this time, the output side capacitor of the power supply has to discharge speedily, so that the electric potential of the output side capacitor of the power supply is the low electric potential.

However, the disadvantage of the conventional power supply is that the output side capacitor of the power supply cannot discharge speedily when the output voltage of the power supply is changed from the high voltage to the low voltage.

SUMMARY OF THE INVENTION

In order to solve the above-mentioned problems, an object of the present invention is to provide a speedy discharging circuit.

In order to solve the above-mentioned problems, another object of the present invention is to provide a power supply apparatus with the speedy discharging circuit.

In order to achieve the object of the present invention mentioned above, the speedy discharging circuit is applied to a power supply. The speedy discharging circuit is electrically connected to the power supply. The power supply comprises a power output side and an output side capacitor. The output side capacitor is electrically connected to the power output side. The speedy discharging circuit comprises an energy consuming unit, a switch unit and a switch control unit. The energy consuming unit is electrically connected to the power output side and the output side capacitor. The switch unit is electrically connected to the energy consuming unit. The switch control unit is electrically connected to the switch unit. When the switch control unit receives a sleep signal, the switch control unit turns on the switch unit, so that the output side capacitor discharges to the energy consuming unit.

In order to achieve another object of the present invention mentioned above, the power supply apparatus comprises a power supply and a speedy discharging circuit. The speedy discharging circuit is electrically connected to the power supply. The power supply comprises a power output side and an output side capacitor. The output side capacitor is electrically connected to the power output side. The speedy discharging circuit comprises an energy consuming unit, a switch unit and a switch control unit. The energy consuming unit is electrically connected to the power output side and the output side capacitor. The switch unit is electrically connected to the energy consuming unit. The switch control unit is electrically connected to the switch unit. When the switch control unit receives a sleep signal, the switch control unit turns on the switch unit, so that the output side capacitor discharges to the energy consuming unit.

The advantage of the present invention is that when the output voltage of the power supply is changed from the high voltage to the low voltage, the output side capacitor of the power supply can discharge speedily, so that the electric potential of the output side capacitor of the power supply is a low electric potential.

DETAILED DESCRIPTION OF THE INVENTION

Please refer to following detailed description and figures for the technical content of the present invention. The following detailed description and figures are referred for the present invention, but the present invention is not limited to it.

Figure 1:
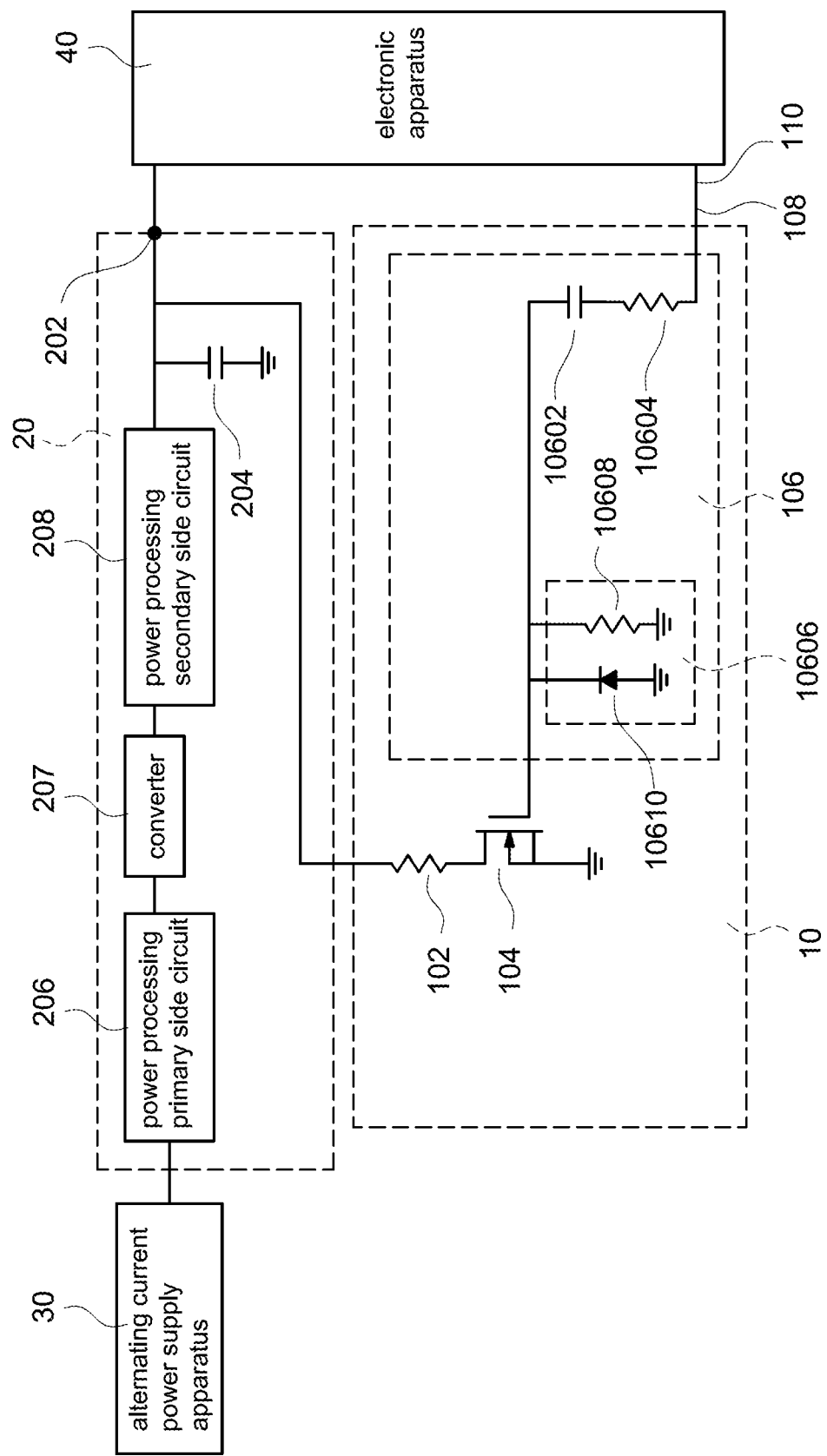
FIG. 1 shows a block diagram of the speedy discharging circuit of the present invention.

FIG. 1 shows a block diagram of the speedy discharging circuit of the present invention. A speedy discharging circuit 10 is applied to a power supply 20, an alternating current power supply apparatus 30 and an electronic apparatus 40 (for example, a printer). The power supply 20 comprises a power output side 202, an output side capacitor 204, a power processing primary side circuit 206, a converter 207 and a power processing secondary side circuit 208. The speedy discharging circuit 10 comprises an energy consuming unit 102, a switch unit 104 and a switch control unit 106. The switch control unit 106 comprises a charging-discharging subunit 10602, a current-limiting subunit 10604 and a discharging subunit 10606. The discharging subunit 10606 comprises an energy consuming component 10608 and a current unidirectional component 10610.

The speedy discharging circuit 10 is electrically connected to the power supply 20. The output side capacitor 204 is electrically connected to the power output side 202. The power processing primary side circuit 206 is electrically connected to the alternating current power supply apparatus 30. The power processing secondary side circuit 208 is electrically connected to the power output side 202, the output side capacitor 204 and the power processing primary side circuit 206. The electronic apparatus 40 is electrically connected to the power output side 202 and the current-limiting subunit 10604 of the switch control unit 106. The converter 207 is electrically connected to the power processing primary side circuit 206 and the power processing secondary side circuit 208.

The energy consuming unit 102 is electrically connected to the power output side 202 and the output side capacitor 204. The switch unit 104 is electrically connected to the energy consuming unit 102. The switch control unit 106 is electrically connected to the switch unit 104. The charging-discharging subunit 10602 is electrically connected to the switch unit 104. The discharging subunit 10606 is electrically connected to the switch unit 104 and the charging-discharging subunit 10602. The current-limiting subunit 10604 is electrically connected to the charging-discharging subunit 10602. The energy consuming component 10608 is electrically connected to the switch unit 104 and the charging-discharging subunit 10602. The current unidirectional component 10610 is electrically connected to the switch unit 104, the charging-discharging subunit 10602 and the energy consuming component 10608.

When the switch control unit 106 receives a sleep signal 108 (for example, a high signal), the switch control unit 106 turns on the switch unit 104, so that the output side capacitor 204 discharges to the energy consuming unit 102, wherein a discharge path comprises the output side capacitor 204, the energy consuming unit 102, the switch unit 104 and ground. Moreover, the sleep signal 108 comes from the electronic apparatus 40, the power supply 20 or any places. The sleep signal 108 means that the electronic apparatus 40 or the power supply 20 will enter a sleeping mode or a standby mode, and at this time an output voltage of the power supply 20 has to change to a low voltage for energy saving. Therefore, the output side capacitor 204 has to discharge speedily, so that an electric potential of the output side capacitor 204 is a low electric potential.

In an embodiment, the charging-discharging subunit 10602 is a capacitor. The switch unit 104 is, for example but not limited to, a NMOS. When the charging-discharging subunit 10602 is charged by the sleep signal 108 and the charging-discharging subunit 10602 is not fully charged, the switch unit 104 is turned on (because this is a phenomenon that the capacitor is charged but not fully charged), so that the output side capacitor 204 discharges to the energy consuming unit 102. Moreover, once the charging-discharging subunit 10602 is fully charged, the switch unit 104 is turned off (because this is a phenomenon that the capacitor which is fully charged will block the direct current power), so that the output side capacitor 204 does not discharge to the energy consuming unit 102. A conducting time of the switch unit 104 is controlled by the charging-discharging subunit 10602 and the current-limiting subunit 10604. If a capacitance of the charging-discharging subunit 10602 is larger, a discharge time of the output side capacitor 204 is longer.

When the switch control unit 106 receives a non-sleep signal 110 (for example, a low signal or a ground signal), the charging-discharging subunit 10602 discharges to the discharging subunit 10606 and the switch unit 104 is turned off, so that the output side capacitor 204 does not discharge to the energy consuming unit 102. Moreover, the non-sleep signal 110 comes from the electronic apparatus 40, the power supply 20 or any places. The non-sleep signal 110 means that the power supply 20 will work in a normal mode (for example, providing the electronic apparatus 40 with power). The output voltage of the power supply 20 is a high voltage. One side of the current-limiting subunit 10604 is connected to the charging-discharging subunit 10602. In an embodiment, the other side of the current-limiting subunit 10604 being connected to ground means that the switch control unit 106 receives the non-sleep signal 110.

The alternating current power supply apparatus 30 sends an alternating current power to the power supply 20. The power processing primary side circuit 206, the converter 207, the power processing secondary side circuit 208 and the output side capacitor 204 convert the alternating current power into the output voltage sent through the power output side 202 to the electronic apparatus 40. The energy consuming unit 102 is, for example but not limited to, a resistor. The current-limiting subunit 10604 is, for example but not limited to, a resistor. The energy consuming component 10608 is, for example but not limited to, a resistor. The current unidirectional component 10610 is, for example but not limited to, a diode.

The converter 207 is used to convert the voltage. The converter 207 converts the high voltage supplied by the alternating current power supply apparatus 30 into the working voltage suitable for the electronic apparatus 40 (for example, converting 110 volts into 12 volts). The power processing primary side circuit 206 is used to convert the alternating current power into the direct current power and send the direct current power to the converter 207 for voltage converting. The power processing secondary side circuit 208 is used to rectify in the output side to improve the output efficiency.

Figure 2:
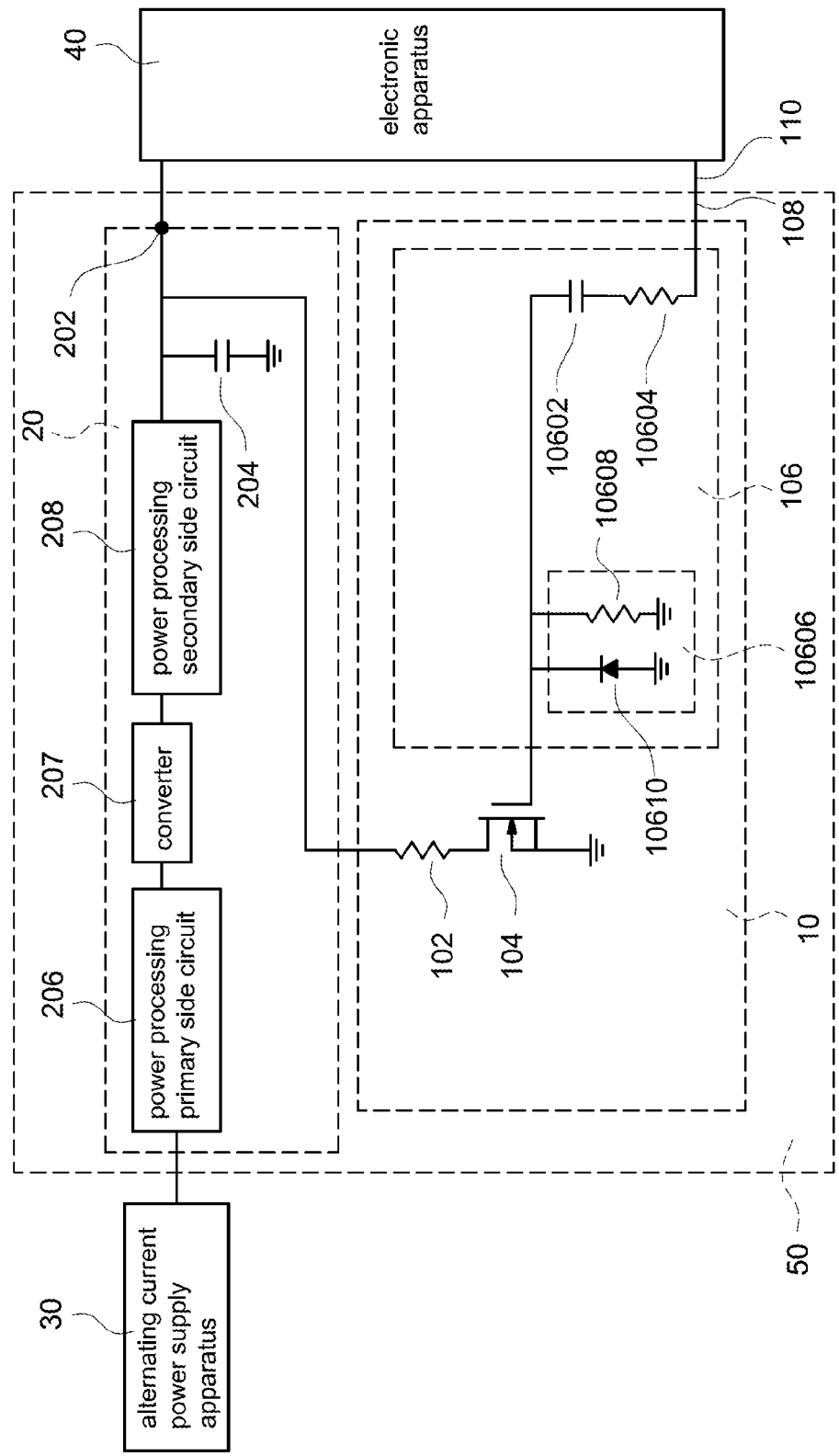
FIG. 2 shows a block diagram of the power supply apparatus of the present invention.

FIG. 2 shows a block diagram of the power supply apparatus of the present invention. A power supply apparatus 50 is applied to an alternating current power supply apparatus 30 and an electronic apparatus 40 (for example, a printer). The power supply apparatus 50 comprises a speedy discharging circuit 10 and a power supply 20. The power supply 20 comprises a power output side 202, an output side capacitor 204, a power processing primary side circuit 206, a converter 207 and a power processing secondary side circuit 208. The speedy discharging circuit 10 comprises an energy consuming unit 102, a switch unit 104 and a switch control unit 106. The switch control unit 106 comprises a charging-discharging subunit 10602, a current-limiting subunit 10604 and a discharging subunit 10606. The discharging subunit 10606 comprises an energy consuming component 10608 and a current unidirectional component 10610.

The speedy discharging circuit 10 is electrically connected to the power supply 20. The output side capacitor 204 is electrically connected to the power output side 202. The power processing primary side circuit 206 is electrically connected to the alternating current power supply apparatus 30. The power processing secondary side circuit 208 is electrically connected to the power output side 202, the output side capacitor 204 and the power processing primary side circuit 206. The electronic apparatus 40 is electrically connected to the power output side 202 and the current-limiting subunit 10604 of the switch control unit 106. The converter 207 is electrically connected to the power processing primary side circuit 206 and the power processing secondary side circuit 208.

The energy consuming unit 102 is electrically connected to the power output side 202 and the output side capacitor 204. The switch unit 104 is electrically connected to the energy consuming unit 102. The switch control unit 106 is electrically connected to the switch unit 104. The charging-discharging subunit 10602 is electrically connected to the switch unit 104. The discharging subunit 10606 is electrically connected to the switch unit 104 and the charging-discharging subunit 10602. The current-limiting subunit 10604 is electrically connected to the charging-discharging subunit 10602. The energy consuming component 10608 is electrically connected to the switch unit 104 and the charging-discharging subunit 10602. The current unidirectional component 10610 is electrically connected to the switch unit 104, the charging-discharging subunit 10602 and the energy consuming component 10608.

When the switch control unit 106 receives a sleep signal 108 (for example, a high signal), the switch control unit 106 turns on the switch unit 104, so that the output side capacitor 204 discharges to the energy consuming unit 102, wherein a discharge path comprises the output side capacitor 204, the energy consuming unit 102, the switch unit 104 and ground. Moreover, the sleep signal 108 comes from the electronic apparatus 40, the power supply 20 or any places. The sleep signal 108 means that the electronic apparatus 40 or the power supply 20 will enter a sleeping mode or a standby mode, and at this time an output voltage of the power supply 20 has to change to a low voltage for energy saving. Therefore, the output side capacitor 204 has to discharge speedily, so that an electric potential of the output side capacitor 204 is a low electric potential.

In an embodiment, the charging-discharging subunit 10602 is a capacitor. The switch unit 104 is, for example but not limited to, a NMOS. When the charging-discharging subunit 10602 is charged by the sleep signal 108 and the charging-discharging subunit 10602 is not fully charged, the switch unit 104 is turned on (because this is a phenomenon that the capacitor is charged but not fully charged), so that the output side capacitor 204 discharges to the energy consuming unit 102. Moreover, once the charging-discharging subunit 10602 is fully charged, the switch unit 104 is turned off (because this is a phenomenon that the capacitor which is fully charged will block the direct current power), so that the output side capacitor 204 does not discharge to the energy consuming unit 102. A conducting time of the switch unit 104 is controlled by the charging-discharging subunit 10602 and the current-limiting subunit 10604. If a capacitance of the charging-discharging subunit 10602 is larger, a discharge time of the output side capacitor 204 is longer.

When the switch control unit 106 receives a non-sleep signal 110 (for example, a low signal or a ground signal), the charging-discharging subunit 10602 discharges to the discharging subunit 10606 and the switch unit 104 is turned off, so that the output side capacitor 204 does not discharge to the energy consuming unit 102. Moreover, the non-sleep signal 110 comes from the electronic apparatus 40, the power supply 20 or any places. The non-sleep signal 110 means that the power supply 20 will work in a normal mode (for example, providing the electronic apparatus 40 with power). The output voltage of the power supply 20 is a high voltage. One side of the current-limiting subunit 10604 is connected to the charging-discharging subunit 10602. In an embodiment, the other side of the current-limiting subunit 10604 being connected to ground means that the switch control unit 106 receives the non-sleep signal 110.

The alternating current power supply apparatus 30 sends an alternating current power to the power supply 20. The power processing primary side circuit 206, the converter 207, the power processing secondary side circuit 208 and the output side capacitor 204 convert the alternating current power into the output voltage sent through the power output side 202 to the electronic apparatus 40. The energy consuming unit 102 is, for example but not limited to, a resistor. The current-limiting subunit 10604 is, for example but not limited to, a resistor. The energy consuming component 10608 is, for example but not limited to, a resistor. The current unidirectional component 10610 is, for example but not limited to, a diode.

The converter 207 is used to convert the voltage. The converter 207 converts the high voltage supplied by the alternating current power supply apparatus 30 into the working voltage suitable for the electronic apparatus 40 (for example, converting 110 volts into 12 volts). The power processing primary side circuit 206 is used to convert the alternating current power into the direct current power and send the direct current power to the converter 207 for voltage converting. The power processing secondary side circuit 208 is used to rectify in the output side to improve the output efficiency.

The advantage of the present invention is that when the output voltage of the power supply is changed from the high voltage to the low voltage, the output side capacitor of the power supply can discharge speedily, so that the electric potential of the output side capacitor of the power supply is a low electric potential.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A speedy discharging circuit applied to a power supply, the speedy discharging circuit electrically connected to the power supply, the power supply comprising a power output side and an output side capacitor, the output side capacitor electrically connected to the power output side, the speedy discharging circuit comprising:
    an energy consuming unit electrically connected to the power output side and the output side capacitor;
    a switch unit electrically connected to the energy consuming unit; and
    a switch control unit electrically connected to the switch unit,
    wherein when the switch control unit receives a sleep signal, the switch control unit turns on the switch unit, so that the output side capacitor discharges to the energy consuming unit;
    wherein the switch control unit comprises:
        a charging-discharging subunit electrically connected to the switch unit; and
    wherein when the charging-discharging subunit is charged by the sleep signal and the charging-discharging subunit is not fully charged, the switch unit is turned on, so that the output side capacitor discharges to the energy consuming unit.

2. The speedy discharging circuit in claim 1, wherein the switch control unit further comprises:
    a discharging subunit electrically connected to the switch unit and the charging-discharging subunit,
    wherein when the switch control unit receives a non-sleep signal, the charging-discharging subunit discharges to the discharging subunit and the switch unit is turned off, so that the output side capacitor does not discharge to the energy consuming unit.

3. The speedy discharging circuit in claim 2, wherein the discharging subunit comprises:
    an energy consuming component electrically connected to the switch unit and the charging-discharging subunit; and a current unidirectional component electrically connected to the switch unit, the charging-discharging subunit and the energy consuming component.

4. The speedy discharging circuit in claim 3, wherein the switch control unit further comprises:
a current-limiting subunit electrically connected to the charging-discharging subunit.

5. A power supply apparatus comprising:
a power supply; and
a speedy discharging circuit electrically connected to the power supply,
wherein the power supply comprises:
a power output side; and
an output side capacitor electrically connected to the power output side,
wherein the speedy discharging circuit comprises:
an energy consuming unit electrically connected to the power output side and the output side capacitor;
a switch unit electrically connected to the energy consuming unit; and
a switch control unit electrically connected to the switch unit,
wherein when the switch control unit receives a sleep signal, the switch control unit turns on the switch unit, so that the output side capacitor discharges to the energy consuming unit,
wherein the switch control unit comprises:
a charging-discharging subunit electrically connected to the switch unit, and
wherein when the charging-discharging subunit is charged by the sleep signal and the charging-discharging subunit is not fully charged, the switch unit is turned on, so that the output side capacitor discharges to the energy consuming unit.

6. The power supply apparatus in claim 5, wherein the switch control unit further comprises:
a discharging subunit electrically connected to the switch unit and the charging-discharging subunit,
wherein when the switch control unit receives a non-sleep signal, the charging-discharging subunit discharges to the discharging subunit and the switch unit is turned off, so that the output side capacitor does not discharge to the energy consuming unit.

7. The power supply apparatus in claim 6, wherein the discharging subunit comprises:
an energy consuming component electrically connected to the switch unit and the charging-discharging subunit; and
a current unidirectional component electrically connected to the switch unit, the charging-discharging subunit and the energy consuming component.

8. The power supply apparatus in claim 7, wherein the switch control unit further comprises:
a current-limiting subunit electrically connected to the charging-discharging subunit.

* * * * *